Aug. 9, 1932.  J. B. DAVIS  1,870,897
PISTON METER
Filed Sept. 20, 1930   3 Sheets-Sheet 1
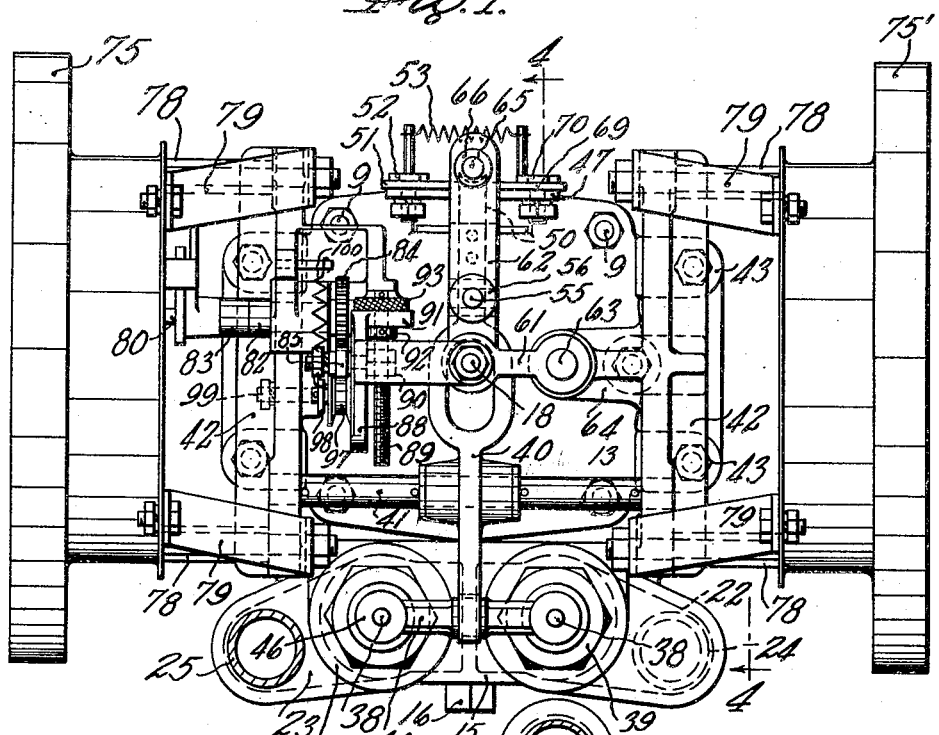
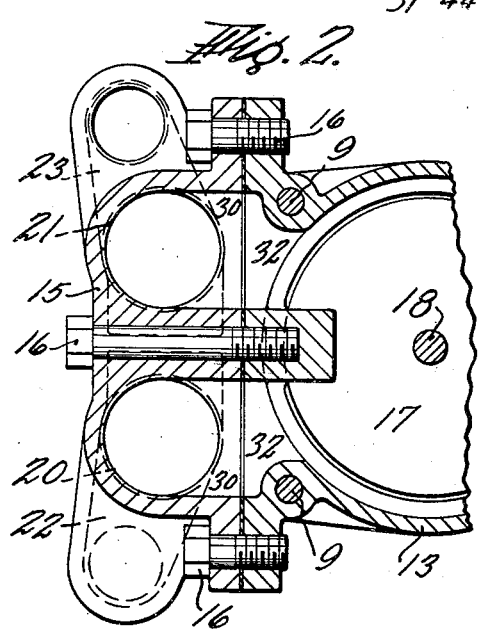
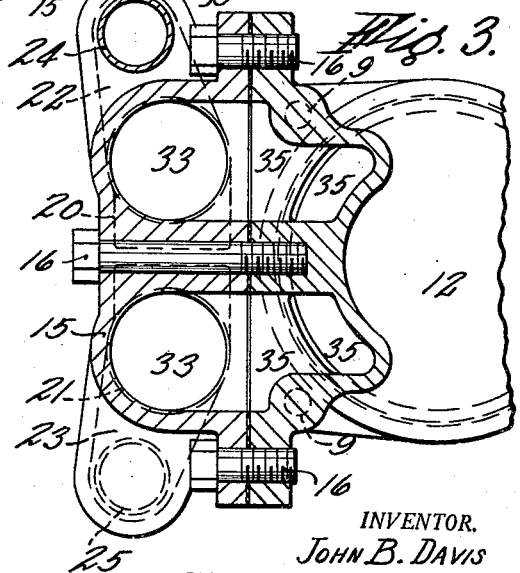
INVENTOR.
JOHN B. DAVIS
BY Chapin + Neal
ATTORNEYS.

Aug. 9, 1932.    J. B. DAVIS    1,870,897
PISTON METER
Filed Sept. 20, 1930    3 Sheets-Sheet 2
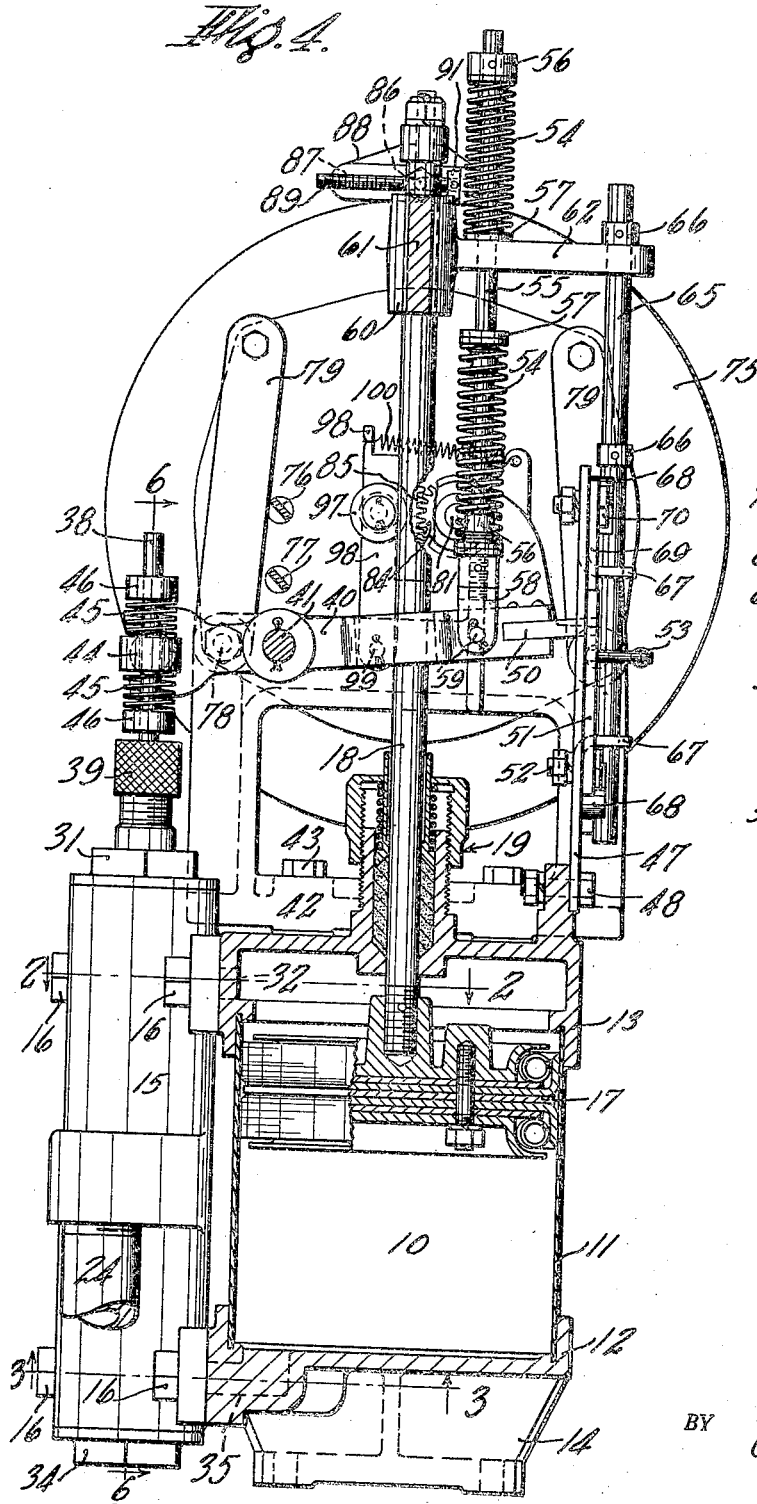
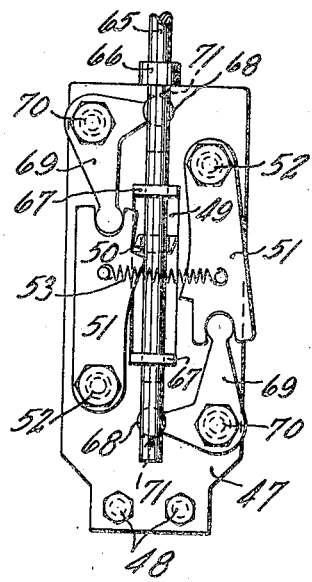
INVENTOR.
JOHN B. DAVIS
BY Chapin & Neal
ATTORNEYS.

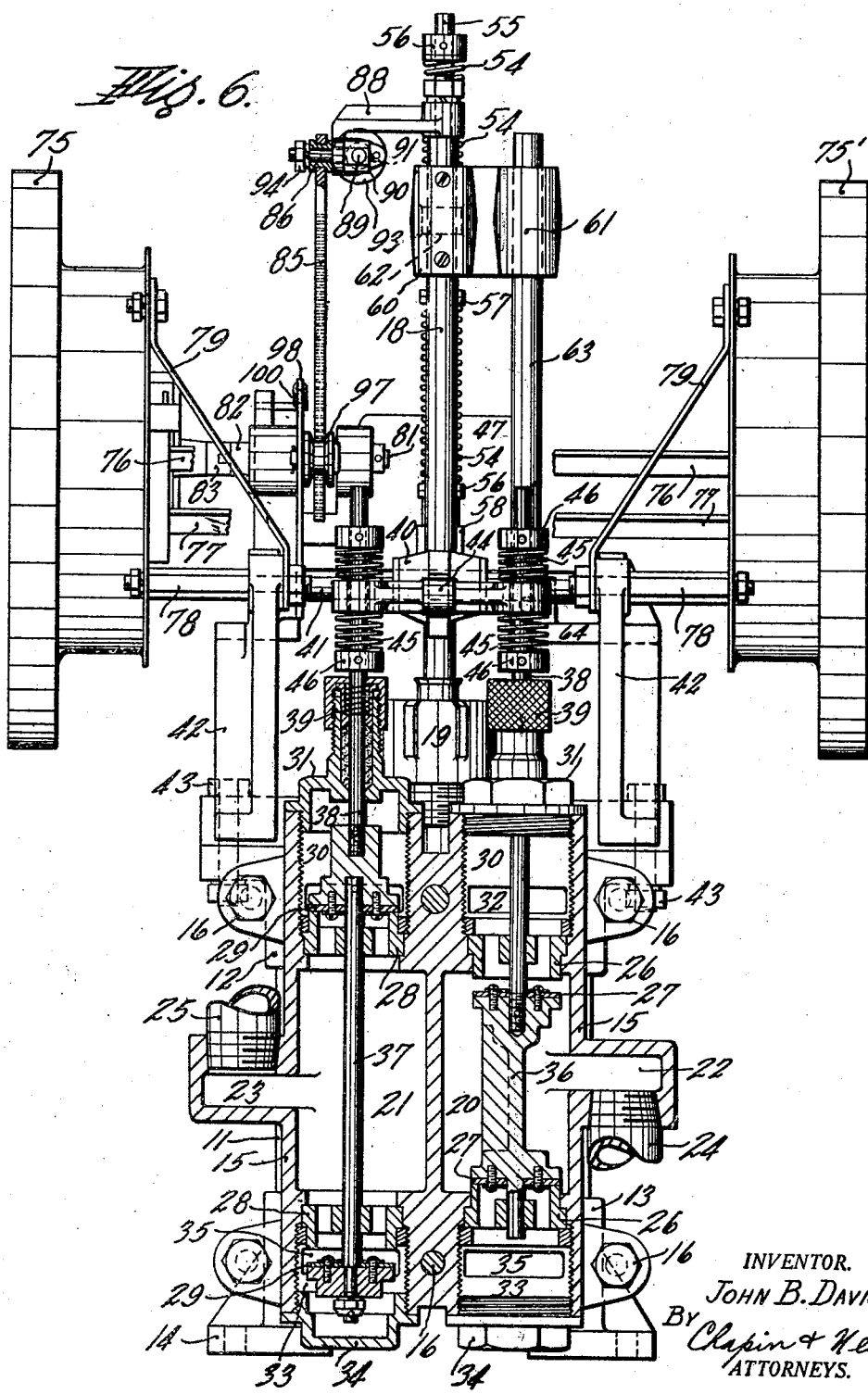

Patented Aug. 9, 1932

1,870,897

UNITED STATES PATENT OFFICE

JOHN B. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS

PISTON METER

Application filed September 20, 1930. Serial No. 483,260.

This invention relates to improvements in that class of liquid measuring devices known as piston meters.

In devices of this character, the pressure of the liquid flowing through the meter causes a piston to travel back and forth and each full stroke of the piston displaces some definite measured quantity of liquid. Valve mechanism is provided to automatically reverse the flow of liquid to and from opposite ends of the cylinder at the end of each stroke of the piston. The quantity of liquid flowing through the meter is registered by some sort of counting device which indicates the number of strokes made by the piston.

Meters of this type, operating on the displacement principle, have the advantage that accuracy of measurement is not impaired by variations in pressure of the liquid forced therethrough, as distinguished from flow meters where the pressure needs to be kept within close limits at a constant figure to insure accurate measurement. Piston meters are thus desirable for use in the so-called "meter type" gasoline dispensers because of the superior accuracy in measurement. Generally, however, flow meters have been used for this purpose because of their lower cost. Satisfactory piston meters, of the types found in the prior art, are too expensive to manufacture.

This invention has for one object to provide an improved piston meter, which will be satisfactory for use in gasoline dispensers of the type described as well as for other purposes, and which is so designed as to enable it to be manufactured in quantities at low unit cost.

More particularly it is an object to provide a meter of this type which is constructed of a number of independent units, such as a cylinder unit including the piston and piston rod; a valve chest unit, including the several valves, stems and inlet and outlet chambers; a latch mechanism unit including latches for restraining the valves from operation until the piston reaches the ends of its stroke and releasing means therefor; and a register unit. These several units may be separately constructed and then assembled into one unitary structure, which is an important manufacturing advantage.

Another object is to provide improved valve mechanism, and operating mechanism therefor, calculated to avoid sticking of the valves due to the gum content of the gasoline and also to afford quiet operation.

Another object is to provide improved latch mechanism and releasing means therefor.

Other objects will appear as the detailed description proceeds and will be pointed out in the appended claims.

The invention will be disclosed with reference to the accompanying drawings, in which:—

Fig. 1 is a top plan view of a meter embodying the invention;

Figs. 2 and 3 are fragmentary sectional plan views taken on the lines 2—2 and 3—3, respectively, of Fig. 4;

Fig. 4 is a cross sectional view taken on the line 4—4 of Fig. 1;

Fig. 5 is a fragmentary elevational view showing the latch mechanism and releasing means therefor; and Fig. 6 is a sectional view taken on the line 6—6 of Fig. 4.

Referring to these drawings and particularly to Fig. 4, the cylinder 10 of the meter is formed by a sleeve or barrel 11, held between and closed at its ends by a pair of heads 12 and 13. These heads are held together in any suitable way, as by tie rods 9, indicated in Figs. 1, 2 and 3. Where the meter is vertically disposed, as shown, the lower head 12 forms the supporting base of the meter and may be provided with legs 14 for the purpose. The upper and lower heads are interconnected by a valve chest 15, secured to each by cap screws 16. Within the cylinder 10 is a piston 17, having a piston rod 18, extending upwardly through a stuffing box 19 formed in the upper head 13.

The valve chest 15 (Fig. 6) is formed with two vertically disposed chambers 20 and 21, arranged side by side in parallel relation. These chambers 20 and 21 have, intermediate their ends, passages 22 and 23 respectively, which extend radially outwardly for connection to supply and discharge pipes 24 and 25, respectively. At each end of chamber 20 and suitably fixed in place, as indicated, are bushings 26, the inner and adjacent end faces of which form seats to be engaged by inlet valves 27, preferably of the leather faced type as indicated. At each end of chamber 21 are similar bushings 28, the outer and non-adjacent end faces of which form seats to be engaged by outlet valves 29, preferably of a similar type. Above the upper bushings 26 and 28 are chambers 30, closed at their upper ends by easily removable caps 31. These chambers 30 are connected by lateral passages 32 to the interior of head 13 and the upper clearance space of cylinder 10, in the manner clearly shown in Fig. 2. Below the lower bushings 26 and 28 are chambers 33, closed at their lower ends by removable caps 34. Chambers 33 are connected by passages 35 to the lower clearance space of cylinder 10 in a manner which will be clear from Figs. 3 and 4. The inlet valves 27 are interconnected by a member 36 so that when either one is seated the other must be unseated. The outlet valves 29 are interconnected by a rod 37 for a like reason but are disposed in the chambers 30 and 33 rather than in the chamber, such as 21, which lies between the seats. The inlet valves lie in the inlet chamber 20. The purpose of this arrangement is to allow both inlet and outlet valves to be simultaneously reciprocated by a single mechanism and yet secure alternate operation of the valves in the upper set and also in the lower set.

As will be clear from Fig. 6, when the lower inlet valve is closed, the lower outlet valve is open and when the upper inlet valve is open the upper outlet valve is closed. Thus, the inlet chamber 20 may be connected first to one and then to the other end of cylinder 10 and, while either end of the latter is connected to the inlet chamber, the other end of the cylinder will be connected to the outlet chamber. Pressure of the liquid supplied through pipe 24, will move the piston 17 back and forth in its cylinder, the valves being operated sharply and suddenly at the end of each stroke of the piston. The connected pair of inlet valves and the connected pair of outlet valves are each provided with a rod 38, extending upwardly through a suitable stuffing box 39 in cap 31 and in parallel relation with the piston rod 18.

The valve operating mechanism includes a rocker arm 40, mounted to turn on a shaft 41, secured at its ends in a pair of upstanding brackets 42, fixed by bolts 43 to the upper head 13. This rocker arm extends diametrically across head 13 and as shown in Fig. 1, is centrally slotted to permit the piston rod 18 to pass therethrough. The end of the short arm of this rocking lever 40 is forked (Figs. 4 and 6), to receive the central cylindrical portion of a cross bar 44. The valve rods 38 pass freely through this cross bar, one near each end thereof. Encircling each rod 38 are a pair of coil springs 45, arranged one above and one below the cross bar. Each such spring acts between the cross bar and a collar 46 fixed to its rod 38. These springs 45 have an equalizing and a shock absorbing function. When lever 40 is moved to reverse the valves by the spring impulse means to be described, it moves extremely rapidly and its movement is suddenly arrested by the engagement of an inlet valve 27 and an outlet valve 29 with their respective seats. The springs 45 serve to take the shock due to the sudden arresting of the movement of the lever 40 and, incidentally eliminate much of the noise which would otherwise be caused. If one valve, as 27, engages its seat a little ahead of the other valve, as 29, one of the springs 45 on the rod 38 which operates valve 27 can compress and allow the continued movement necessary to seat valve 29.

The valve operating lever 40 is held in one or the other of its two extreme positions by the latch mechanism shown in Fig. 5. A supporting plate 47, secured by bolts 48 as shown in Fig. 4 to an upstanding lug on head 13, has a vertical slot 49 to receive a hardened latch block 50, fixed to lever 40, and permit free movement of the block. Latches 51, pivotally supported from plate 47 by studs 52, are arranged one on each side of slot 49 and are interconnected by a spring 53, tending to draw them together. The left hand latch 51 serves to hold lever 40 in its upper position while the right hand latch serves to hold it in its lower position. As shown, the lever 40 is latched in its upper position and the lower set of springs 45 tend to press the latch block 50 against the left hand latch as well as to press an inlet valve 27 and outlet valve 29 against their respective seats.

The valves are operated by a spring impulse mechanism, including two coil springs 54, encircling a rod 55 and each having seats 56 and 57 which are fixed and slidable respectively, on the rod. The lower end of rod 55 has fixed thereto a fork 58, which straddles rocker arm 40 and is pivotally connected thereto by a pin 59. The piston rod 18 has fixed thereto near its upper end a member 60 having two radially projecting arms 61 and 62 arranged at right angles. The outer end of arm 61 is slidably engaged with a vertical guide rod 63, fixed at its lower end to a lug 64 formed on one of the brackets 42 (Fig. 6). The other arm 62 slidably engages the rod 55 and is disposed between the two springs 54 in position to engage the movable seats 57 thereof. The piston rod 18 is shown at the end of its upward stroke. The upper spring 54 is in expanded condition and has just lifted rod 55 and lever 40 into the positions illustrated. The valves 27 and 29 have been set to admit liquid under pressure to the upper end of cylinder 10 and piston 17 is about to descend. The lever 40 cannot move until latch 51 is released. As rod 18 descends, arm 62 will compress the lower spring 54, placing it under stress for subsequently driving lever 40. While not necessarily limited thereto, the spring 54 is usually compressed until successive coils abut,—the abutment of these coils occurring at the instant when the latch 51 is released. The upper drive spring 54 is compressed in a similar manner while the lever 40 is held in its lower position by the right hand latch 51 of Fig. 5.

The releasing means for the latches will next be described. Such means is also actuated by the arm 62, just described. This arm slidably engages a latch release rod 65 and moves the same vertically up or down by abutment with upper and lower collars 66, fixed to the rod. This rod is slidably mounted in suitable bearings on the support 47 and, as shown, these bearings are formed in lugs 67 outwardly and right angularly turned from plate 47. The back side of this rod is provided with upper and lower recesses, each receiving the circular end 68 of a bellcrank 69. Each bellcrank is pivotally mounted on a stud 70 secured to plate 47 and is interengaged, as clearly indicated in Fig. 5, with the adjacent latch 51. The flat face of each end 68 lies parallel and substantially contiguous with the flat wall of its recess in rod 65 (Fig. 4), whereby undue turning of the latter rod is prevented. These recesses are long enough to allow rod 65 to move relatively to the ends 68 of the bellcranks at certain times. The upper wall of the upper recess and the lower wall of the lower recess form the shoulders 71 which actuate the bellcranks. The arm 62, just prior to reaching the end of its upward stroke engaged the upper collar 66 and lifted it and rod 65 the small amount necessary to release the right hand latch 51. The actual release occurs at the exact end of the stroke of piston 17. The lower shoulder 71 engaged the end 68 of the latch to effect the result. As arm 62 descends it will first compress the lower drive spring 54, as above described, and will finally engage the lower collar 66, lowering rod 65 and causing the upper shoulder 71 to engage and move the end 68 of the left hand bellcrank 69, thereby releasing the left hand latch 51. At the same time, the lower shoulder is moved downwardly allowing the right hand latch 51 to snap back under the action of spring 53 into position to hold the latch block 50. As the latter is released by the left hand latch, the previously stressed lower drive spring 54 expands and drives lever 40 into its lower position, lifting the valve rods 38 and reversing the flow of liquid to and from cylinder 10. The lever will be retained in its lower position by the right hand latch while piston rod 18 rises and places the upper drive spring under stress and finally lifts upper collar 66 to effect a release of the right hand latch 51 and allow movement of the left hand latch back into latching position.

The parts are so adjusted and timed that the piston will displace some accurately measured unit quantity of liquid, say one gallon, on each complete stroke of the piston. To register the quantities delivered it is thus only necessary to count the number of strokes of the piston. Any suitable registering apparatus may be provided for this purpose. In the drawings, I have indicated two dial registers 75 and 75', such as are usually required when the meter is used in connection with a gasoline dispensing apparatus. The register 75 will have appropriate actuating mechanism but the meter 75' need not for its indicating hand or hands can be driven from the mechanism of the other register as by the flexible shafts 76 and 77 (Figs. 4 and 6). Each register is supported from the adjacent bracket 42 by a pair of studs 78 and a pair of bracing straps 79.

The register 75 has an actuating shaft 80 (Fig. 1) and the meter has a shaft 81, which is mounted in one of the brackets 42 and provided with a coupling 82 with which a coupling 83 on shaft 80 may be engaged as shown. Shaft 81 carries a gear 84 and engaged therewith is a rack 85, which is connected to and reciprocated by the piston rod 18. The rack 85 is pivotally mounted on a stud 86 (Fig. 6). This stud is mounted for lateral adjustment in a slot 87 (Fig. 4) formed in an arm 88, secured to the upper end of piston rod 18, in the manner indicated in Fig. 6. An adjusting screw 89 is threaded through the head 90 of stud 86 (Fig. 1) and at one end is rotatably mounted in a lug 91 on arm 88 and held against axial movement therein between a collar 92 on the screw and the knurled head 93 thereof. By turning head 93, the screw 89 will move stud 86 along slot 87 to various positions of adjustment and the stud may be locked in any of its various positions of adjustment by a nut 94. The lower end of rack 85 is held in mesh with gear 84 by a grooved roll 97, mounted in a lever 98, pivoted on a stud 99 fixed to one of the brackets 42. A spring 100, interconnects the last named bracket and lever and tends to press roll 97 and rack 85 against gear 84.

It will be clear that a reciprocation of rack 85 will turn gear 84 and thus shaft 80 of the register. The back and forth movement of gear 84 is converted into continuous rotation of the register hands in one direction by appropriate mechanism inside the register and not necessary to consider here. The present application merely is intended to show a drive from the piston rod 18 suitable for actuating a register. This drive embodies means, such as the screw 89 for offsetting the pivot 86 of rack 85 to vary the extent of rotation of gear 84 for a given stroke of the piston rod. With the meter set so that its piston displaces an accurately measured quantity on each stroke, the screw 89 is turned until the rack 85 on each stroke gives just the right amount of rotation to gear 84 to cause the proper indication on the register. The parts, as shown, are set for a minimum degree of rotation of gear 84 under such conditions. By moving the pivot 86 of rack 85 to the left, as viewed in Fig. 4, a greater degree of rotation of gear 84 will be secured.

The operation will next be described. With the parts positioned as shown, the upper inlet valve 27 and the lower outlet valve 29 are open and the other valves closed. Liquid, formed into chamber 20, will pass into the upper end of cylinder 10 and force piston 17 downwardly,—the piston forcing the liquid beneath it out through the open lower outlet valve into chamber 21 and pipe 25. The piston rod 18 descends and arm 62 thereon eventually engages seat 57 of the lower drive spring 54 and forces it downwardly, compressing this spring against the seat 56, which is then held stationary because the rocker arm 40 is held in its upper position by the left hand latch 51. The stressing of the spring continues until arm 62 engages the lower collar 66 and moves rod 65 far enough to release the left hand latch. Upon release of the rocker arm 40, the lower spring 54 expands and drives it into its lower position,—the right hand latch 51 moving in to retain it there. This movement of the rocker arm simultaneously moves all the valves and effects a reversal of flow of liquid to and from the cylinder 10. The upper inlet valve 27 suddenly closes and the lower inlet valve opens to admit liquid to the lower end of the cylinder. Also, the lower outlet valve suddenly closes and the upper outlet valve opens. The piston rod 18 then moves upwardly and arm 62 will compress the upper spring 54 and finally engage the upper collar 66 to lift rod 65 and release the right hand latch 51. Thereupon, this spring will drive rocker arm 40 upwardly into the illustrated position and again reverse the flow of liquid to and from the cylinder. The quantities displayed by successive strokes of the piston are indicated on register 75, the same being operated from the piston rod by the rack 85 and gear 84, as above described.

In manufacturing the meter, the unit construction is of advantage. The cylinder with its barrel 11, heads 12 and 13, piston 17 and piston rod 18, may be constructed and assembled as one independent unit. This unit may also include the members 61, 62, 63 and 88, with the drive rod 55 and springs assembled thereon as well as the rack bar 85 and brackets 42. The valve mechanism is another independent unit which, after being completely assembled, is simply bolted to the heads 12 and 13. The rocker arm 40 is then put in place and connected to the cross bar 44 of the valve mechanism and the fork 58 of the drive rod. The latch mechanism with release rod 65 is a third independent unit,—all parts being mounted on the plate support 47. With the upper collar 66 removed, rod 65 is slid through arm 62, after which plate 47 is bolted in place and the aforesaid collar applied. The register driving means, including gear 84, will be assembled in bracket 42, as will also the roll lever 98. By swinging back this lever, rack 85 may be meshed with gear 84 in the proper relation, after which the lever will be moved back into the position shown. The register 75 is complete in itself and requires only to be bolted in place after the couplings 82 and 83 have been engaged.

All parts of the valve operating and controlling mechanism are completely exposed and conveniently accessible for the purpose of adjustment and servicing. The valves proper are likewise accessible, when necessary, without a great deal of difficulty. The valve chest 15 may be removed and carry with it the valves for convenience in servicing. The described construction and arrangement of parts has been found most convenient as facilitating inspection, adjustment and servicing of the working parts as well as enabling the meter as a whole to be produced by mass production methods at low unit cost.

What I claim is:

1. A piston meter, comprising, a cylinder, a piston reciprocable therein, a piston rod extending through one end of the cylinder, means including valve mechanism for admitting liquid under pressure first to one and then to the opposite end of said cylinder and for discharging liquid alternately from opposite ends thereof so that when liquid is admitted to either end it will be discharged from the other end, means reciprocable in a path parallel to and at one side of the piston rod for actuating said mechanism, a rocker arm connected to said means and extending across one end of the cylinder at substantially right angles to the axis of the piston rod, latch mechanism for holding said arm in either of its two extreme positions, latch releasing means including a member reciprocable in a path parallel to and on the opposite side of said piston rod from said reciprocable means, a member connected to said piston rod, resilient means operatively interposed between said member and rocker arm and stressed by movement of the piston rod while the arm is held by the latch mechanism for driving said arm when released by the latter, and means on the piston rod for operating the reciprocable member of the latch releasing means to effect release of said arm at the end of each stroke of the piston.

2. A piston meter, comprising, a cylinder, a piston reciprocable therein, a piston rod extending through one end of the cylinder, means including valve mechanism for admitting liquid under pressure first to one and then to the other end of said cylinder and for discharging liquid alternately from said ends so that when liquid is admitted to either end it will be discharged from the opposite end, valve operating means reciprocable in a path parallel to but at one side of the piston rod, a rocker arm connected near one end to said means and extending across one end of the cylinder at substantially right angles to the axis of the piston rod, latch mechanism for holding said rocker arm in either of its two extreme positions, latch releasing means including a member reciprocable in a path parallel to but on the opposite side of said piston rod from said valve operating means, a drive rod pivotally connected to the rocker arm and extending parallel to the piston rod and between the latter and the latch releasing member, drive springs on said drive rod, means on the piston rod slidably engaging the drive rod at a point between said springs and adapted to engage said springs and slidably engaging the latch release member, and means on the latter engageable by the last named means to release said latching mechanism.

3. In a piston meter, an independent cylinder unit comprising a barrel and two heads closing the ends thereof, a piston slidable in the cylinder and a piston rod extending through one of said heads, said heads each having passages for admission of liquid to and discharge of liquid from the cylinder; a second independent unit comprising a valve chest having admission and discharge passages to register with the passages in the heads and to be secured to said heads in a position alongside the cylinder, said chest having an inlet and outlet therein for liquid, valve mechanism in said chest to first connect the admission passage of one head to the inlet and the discharge passage of the other head to the outlet and then connect the admission passage of the other head to the inlet and the discharge passage of the first named head to the outlet; a frame carried by the last named head, a rocker arm pivotally mounted therein and connected at one end to said valve mechanism; a third independent unit comprising latch mechanism to hold the other end of said rocker arm in either of its two extreme positions and latch releasing means; spring impulse means interconnecting the piston rod and rocker arm for driving the latter when released by said latch mechanism; and means on the piston rod for operating said latch releasing means.

4. In a piston meter, a cylinder, piston and piston rod, there being admission and discharge passages leading to each end of said cylinder, valve mechanism for controlling said passages and located alongside the cylinder and extending from end to end thereof in parallel relation with the axis of the piston rod, a valve operating means reciprocable in a path parallel to but at one side of the piston rod, a rocker arm pivotally supported from one end of the cylinder and extending across the same with one end connected to said valve operating means, a support extending from the last named end of the cylinder parallel to but on the opposite side of said piston rod from said valve operating means, latches mounted on said support for engagement with the outer end of the rocker arm, bellcranks one for each latch pivoted to said support for turning the latches, a single reciprocable member periodically moved by the piston rod for operating the bellcranks in alternation, spaced abutments fixed to said member, means on the piston rod for engaging and moving the abutments one near the end of each stroke of the piston rod and spring impulse means stressed by movement of the piston rod for operating the rocker arm when released.

5. In a piston meter, a cylinder, a piston reciprocable therein, a piston rod extending out through one end of the cylinder, a valve chest extending alongside the cylinder, having intermediate its ends an inlet chamber and an outlet chamber and at each end of said chambers passages leading to the adjacent end of said cylinder, a pair of connected inlet valves to control the flow from the inlet chamber to said passages, a pair of connected outlet valves to control the flow from said passages to the outlet chamber, a valve actuating stem for each pair of connected valves, said stems reciprocable in paths parallel to but at one side of the piston rod, a rocker arm extending substantially at right angles to the piston rod, means actuated by movement of the piston rod for intermittently moving said rocker arm first in one and then in the other direction, a cross bar slidably engaged with each valve stem; said rocker arm extending between said stems and engaging said cross bar, a pair of abutments fixed to each valve stem on opposite sides of said cross bar, and a pair of springs coiled about each valve stem and disposed one between each abutment and the cross bar.

6. In a piston meter, a cylinder, a piston therein, a piston rod extending through one end of the cylinder, valve mechanism for admitting liquid under pressure first to one and then to the other end of the cylinder and for discharging liquid alternately from either end of the cylinder while liquid is being admitted to the other end, conduits for said liquid extending from said mechanism to opposite ends of said cylinder, a rocker arm connected near one end to the valve mechanism, spring driving means for the rocker arm, said driving means interposed between said piston rod and rocker arm and stressed by movement of the piston rod, latching means for holding said rocker arm against movement during the stressing of said springs, said means comprising a support mounted on the cylinder and extending parallel with the piston rod and disposed closely adjacent the path of movement of the rocker arm, latches pivoted to said support one on each side of the path of movement of the rocker arm, a spring interconnecting the latches, bellcranks one for each latch pivoted to said support and each having one arm engaged with its latch and another arm extending toward the other latch, and a reciprocable member operated by said piston rod for engaging both of the last named arms of the bellcranks to simultaneously move the same and cause one latch to be moved to release the rocker arm and the other latch to be moved into position to hold said arm.

In testimony whereof I have affixed my signature.

JOHN B. DAVIS.